Patented Nov. 12, 1929

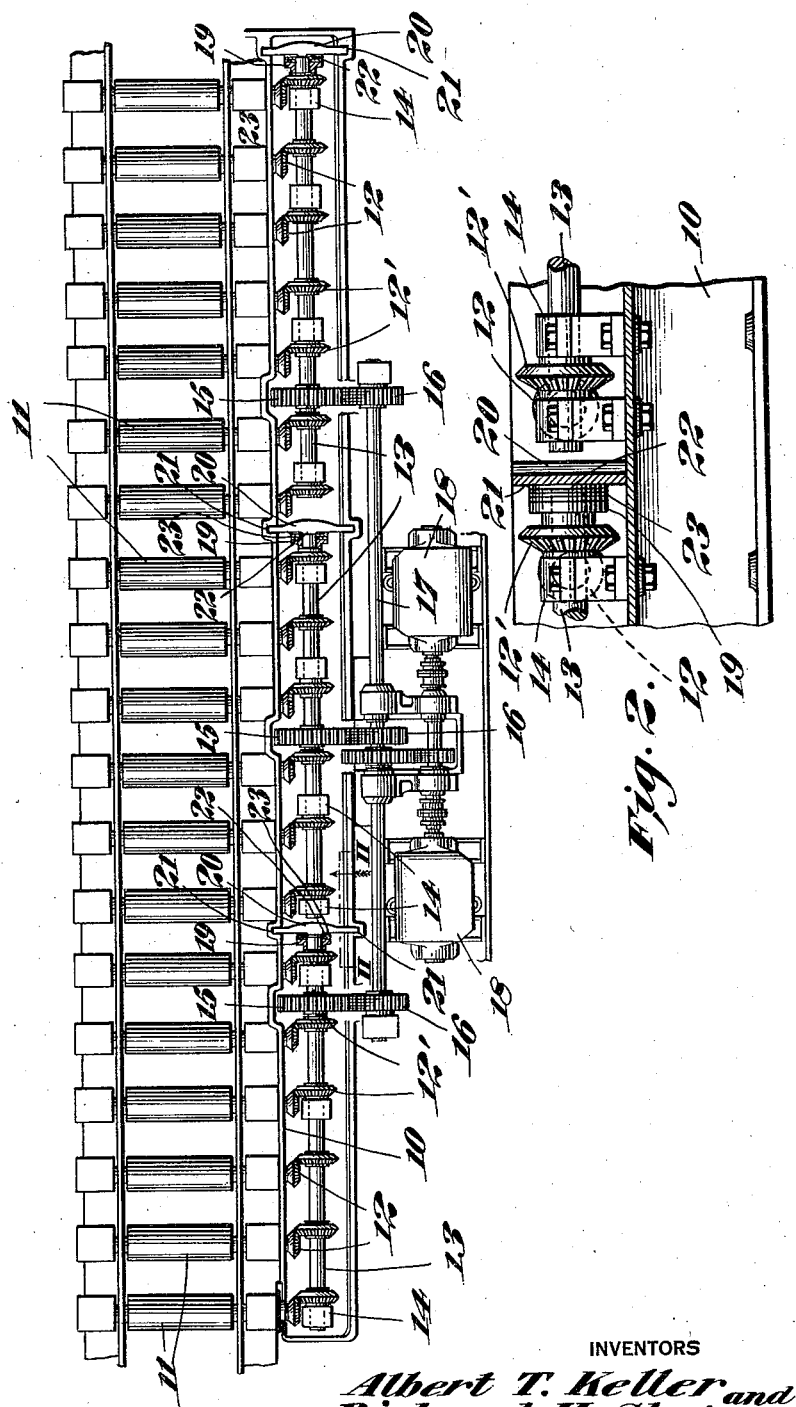

1,735,767

UNITED STATES PATENT OFFICE

ALBERT T. KELLER, OF BETHLEHEM, AND RICHARD H. STEVENS, OF JOHNSTOWN, PENNSYLVANIA, ASSIGNORS TO BETHLEHEM STEEL COMPANY

DRIVE FOR ROLLER TABLES IN ROLLING MILLS

Application filed March 31, 1927. Serial No. 179,781.

Our invention relates to rolling mill equipment and particularly to a feed mechanism for feeding the billets or blanks to the rolls.

Heretofore, feed mechanisms have been employed having driven rollers which are adapted to be driven in one direction and then in a reverse direction accordingly as the blank is to be moved with reference to the rolls. These rollers are usually driven from a continuous line shaft geared to each individual roller. In certain cases, the line shaft thus employed, is exceptionally long and is usually made up of several lengths of shafting, coupled together. In practice with shafts, comprising a plurality of coupled lengths, it is extremely difficult to maintain such lengths in correct alignment, to prevent the overheating of the bearings, and maintain the fastening means for the couplings in a tightened condition. Furthermore, when comparatively long shafting is employed, thrust bearings are usually provided at intervals along the length of the shaft to take up the longitudinal thrust thereon, occasioned by the resultant of the working forces on gears which entrain the shaft to the rollers. When the thrust bearings are disposed at intervals along the coupled shafting, it is uncertain whether the thrust is evenly distributed, and it is also difficult to take up such bearings when they become unduly worn in service. With feed mechanisms of this character, the rollers adjacent the rolling mill are subject to greater wear than those remote therefrom, for the reason that, the rollers in close proximity to the rolls sustain the full weight of the blank during the preliminary rolling, at which time the rollers beyond the length of the blank are not loaded.

It is, therefore, one of the objects of our invention to provide a feeding mechanism for a rolling mill having a plurality of rollers arranged in groups and means to drive each group independently of one another from a common power shaft, whereby one group of rollers may be adjusted or dismantled independently of the other groups, when desired.

Another object of our invention is the provision of a novel and simple bearing device for sustaining the end thrust imposed in service on the drive shaft of each group of rollers.

The novel features of our invention will be more fully understood from the following description and claims taken with the drawing in which:

Fig. 1 is a plan view of a roller train embodying one form of our invention;

Fig. 2 is a cross section, somewhat enlarged taken on line II—II in Fig. 1.

Referring to the drawings: 10 designates the frame of a stationary table provided with rollers 11 journaled in suitable bearings on the frame. At the ends of each roller is fixed a bevel gear 12 which meshes with a corresponding bevel gear 12' keyed or otherwise fixed to one of the independently mounted drive shafts 13 journaled in the bearings 14. While we have shown three such drive shafts, it is not intended as a limitation, but, our invention may be adapted to any length of table and any number of shafts may be employed without departing from the spirit of our invention. Fixedly mounted on each drive shaft 13, is a pinion 15 which meshes with a corresponding pinion 16 fixed to a common power shaft 17. The latter is operatively connected to any suitable reversible power unit, such as motors 18. The end of each shaft 13 is provided with a collar 19, and spaced from the latter is a thrust bar 20 detachably mounted to the framework 10. Preferably, the thrust bar 20 is mounted in open pockets 21 formed in said framework and on the face of said bar, in close proximity to the collar 19, is formed a cylindrical boss 22, coaxial with the drive shaft 13. The shaft 13 projects a short distance beyond the face of the collar 19. On said projecting portion and on the boss 22, is mounted a bearing member 23 interposed between the thrust bar 20 and the collar 19. The member 23 may be an annular disc of single thickness and may be of any suitable bearing metal, such as brass, or said member may comprise a plurality of steel and brass annular discs arranged in alternate relation. The end play of the shaft 13 may be easily adjusted by the employment of discs of varying thickness.

It will be seen that the sides of the pockets 21 firmly support the bars 20 in the general direction of the shafts 13 and sustain the thrust of said shafts which may be imposed on the latter by the resultant of the working forces between the teeth of the gears 12 and 12'. Then assuming that the group of rollers at the left side of Fig. 1 are in juxtapostion to the rolls of the mill and that this group are considerably worn, shafts 13 of this group, with its associated gears 12', may be adjusted vertically downward to maintain gears 12 and 12' in effective operative engagement. The next adjoining group ordinarily will be subjected to lesser wear, the next to still less wear, and so forth. Shaft 13 of each group may be suitably adjusted to compensate for the wear of its particular group of rolls.

It will be seen from the foregoing description that we have devised a novel feed mechanism for feeding a blank to a rolling mill and so arranged that a plurality of short lengths of drive shafts are provided to drive the feed rollers without the employment of coupling members intermediate the ends of said shafts.

While we have shown our invention in but one form, it will be obvious to those skilled in the art that it is not so limited, but is susceptible of various other changes and modifications without departing from the spirit thereof, and we desire, therefore, that only such limitations shall be placed thereupon as are imposed by the prior art or as are specifically set forth in the appended claims.

Having thus described our invention, what we claim as new and desired to secure by Letters Patent is:

1. A feed mechanism for a rolling mill, comprising a plurality of rollers arranged in a substantially straight line from the rolls, independent driven shafts entrained with each group of rollers adapted to be independently adjusted to compensate for wear of the rollers, and a power shaft geared to said drive shafts to drive them in unison.

2. A feed mechanism for rolling mills, comprising a frame, rollers journaled on said frame, a plurality of independent drive shafts geared to said rollers, means to rotate said shafts, thrust bars detachably mounted on said frame and disposed horizontally across said shafts, a collar mounted on each of said shafts and spaced from the end thereof, a boss formed on each of said thrust bars substantially coaxial the shaft related thereto, and a bearing member surrounding said boss and said shaft and interposed between said collars and said thrust bars.

In testimony whereof I hereunto affix my signature.

ALBERT T. KELLER.

In testimony whereof I hereunto affix my signature.

RICHARD H. STEVENS.